United States Patent [19]

Chang et al.

[11] Patent Number: 5,529,328
[45] Date of Patent: Jun. 25, 1996

[54] SHOCK ABSORBING DEVICE FOR A BICYCLE

[76] Inventors: Robert Chang, No. 198, Feng Chou Rd., Shen Kang Hsiang, Taichung Hsien; Tan-jue Hwang, No. 1, Alley 19, Lane 98-21, Sec. 2, Taichung Kang Rd., Taichung, both of Taiwan

[21] Appl. No.: 520,814

[22] Filed: Aug. 30, 1995

[51] Int. Cl.$^6$ ................................. B62K 25/04
[52] U.S. Cl. ........................... 280/276; 280/275
[58] Field of Search .................... 280/276, 277, 280/275, 283, 279; 384/50, 53, 54, 37, 42, 46

[56] References Cited

U.S. PATENT DOCUMENTS

| | | | |
|---|---|---|---|
| 2,477,748 | 8/1949 | Hutchins | 280/277 |
| 3,998,497 | 12/1976 | Koizumi | 384/53 |

FOREIGN PATENT DOCUMENTS

| | | | |
|---|---|---|---|
| 0134674 | 4/1933 | Austria | 280/276 |
| 0177333 | 6/1953 | Austria | 280/276 |
| 0889516 | 12/1981 | U.S.S.R. | 280/276 |

*Primary Examiner*—Anne Marie Boehler
*Attorney, Agent, or Firm*—Peterson, Wicks, Nemer & Kamrath

[57] ABSTRACT

A shock absorbing device for a bicycle, which includes a front fork and two cylinders, the front fork including a frame and two columns each of which has a slot defined therein, the frame having two side plates each of which has at least two rollers rotatably disposed thereto and the column movably disposed and guided between the two rollers by extending a bolt through one end of the cylinder, the slot of the column and being engaged to the side plate, the other end of the cylinder fixedly disposed to the column such that when shocks transferred from a wheel of the bicycle the columns moved upwardly and depress the cylinders to absorb the shocks.

3 Claims, 6 Drawing Sheets

SHOCK ABSORBING DEVICE FOR A BICYCLE

BACKGROUND OF THE INVENTION

1. Field of Invention

The present invention relates to a shock absorbing device which is disposed to a front fork of the bicycle, the front fork including a frame and two columns which are movably disposed to the free, each of the columns connected to a cylinder and having rollers disposed therebeside such that when the bicycle is ridden over a rugged road, the columns are moved and the cylinder are actuated stably by a guidance of the rollers.

2. Related Prior Art

In order to provide a comfortable riding condition for a bicycle, manufacturers develop a shock absorbing device disposed to a front fork of the bicycle, generally, the absorbing device includes two cylinders engaged to the front fork such that when shocks are transferred from the wheel to the front fork, the shocks will be absorbed by actuating the cylinders and therefore the rider may enjoy a comfortable ridding experience when he/she rides the bicycle over a rugged road. However, most of the present shock absorbing devices have a complicated structure which employs many links, bolts and other connecting mechanism, this means a high price is required and such devices are difficult to maintain.

The present invention intends to provide a shock absorbing device for a bicycle, which has a simple structure and is actuated stably so as to mitigate and/or obviate the above-mentioned problems.

SUMMARY OF THE INVENTION

The present invention provides a shock absorbing device for a bicycle, which includes a front fork and two cylinders, the front fork including a frame and two columns each of which has a slot defined therein, the frame having two side plates each of which has at least two sets of rollers rotatably disposed thereto and the column movably disposed and guided between the two sets of rollers by extending a bolt through one end of the cylinder, the slot of the column and engaging to the side plate, the other end of the cylinder fixedly disposed to the column such that when shocks transferred from a wheel of the bicycle, the columns move upwardly and depress the cylinders to absorb the shocks.

It is an object of the present invention to provide a shock absorbing device which has a simple structure and can be operated to absorb shocks stably.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
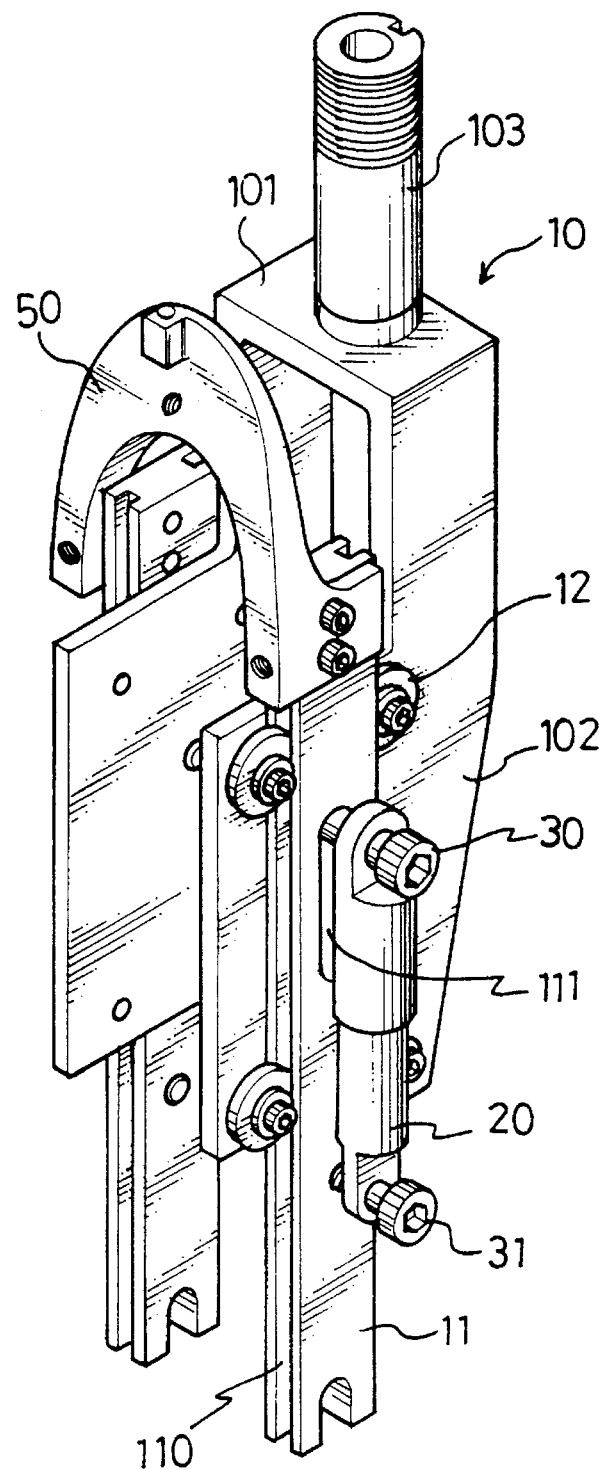
FIG. 1 is a perspective view of a shock absorbing device in accordance with the present invention.
Figure 2:
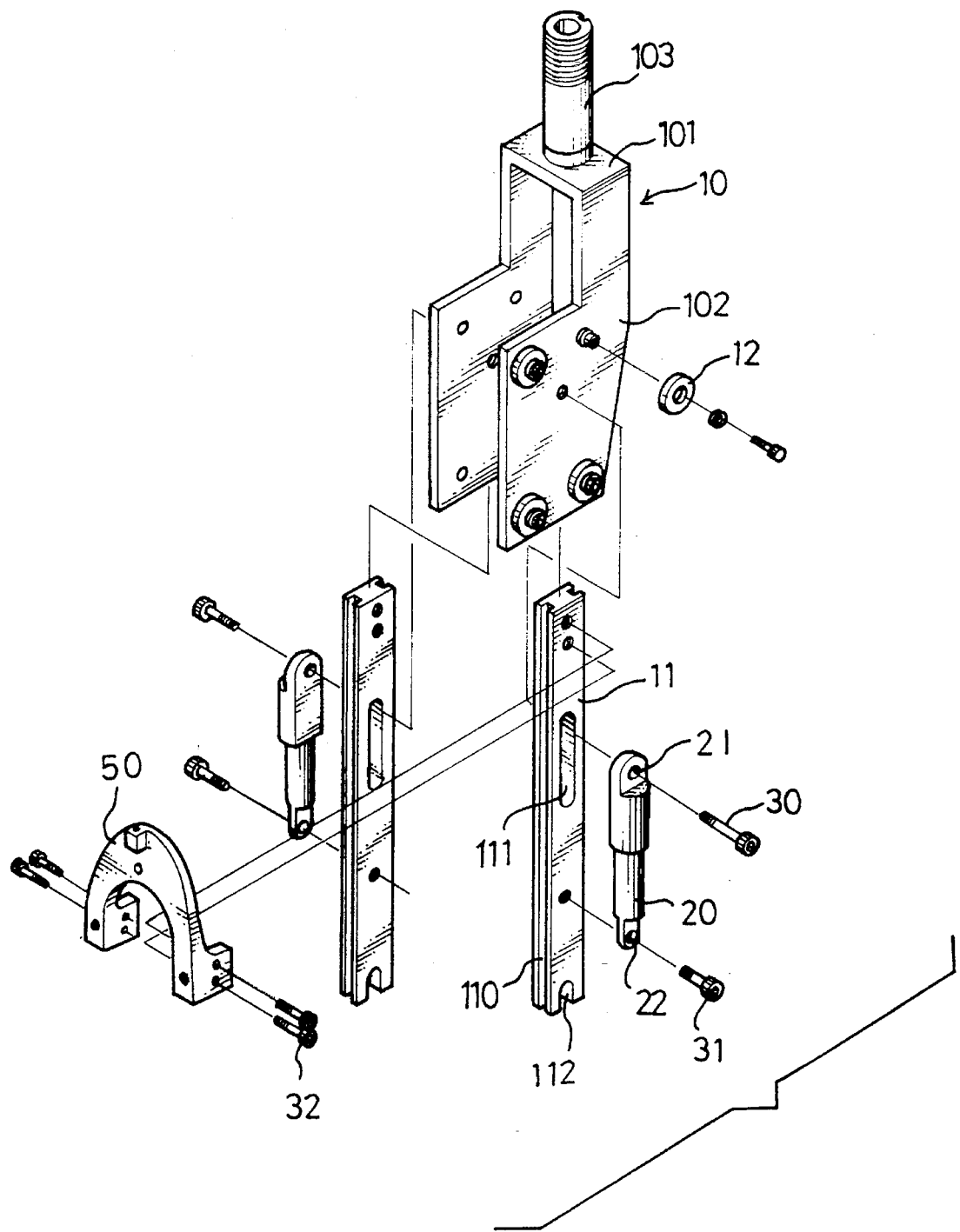
FIG. 2 is an exploded view of the shock absorbing device in accordance with the present invention.
Figure 3:
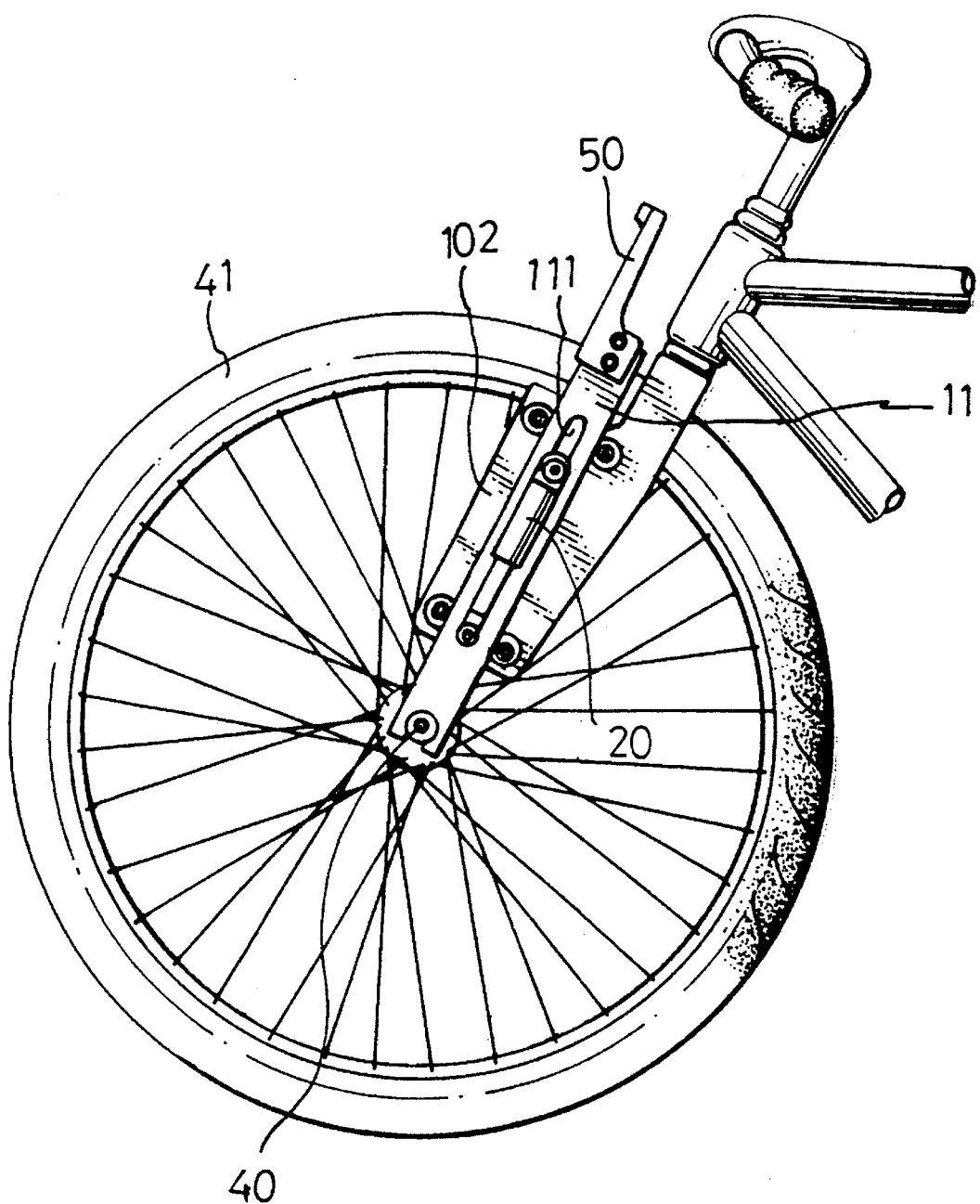
FIG. 3 is a side elevational view of the shock absorbing device disposed to a bicycle which is partly moved away.

Referring to the drawings and initially to FIGS. 1 through 3, a shock absorbing device in accordance with the present invention generally includes a front fork which includes a frame 10 and two columns 11, a wheel 41 rotatably received between the two columns 11, the frame 10 having a top 101 and two side plates 102 extending in parallel with each other and downwardly from the top 101, each of the side plates 102 having two sets of rollers 12 rotatably disposed to an outer side thereof, each set of the rollers 12 including two rollers 12 and a steerer tube 103 extending upwardly from the top 101. Each of the columns 11 has two sides, a first end and a second end, each of the two sides thereof having a first groove 110 defined longitudinally therein and a slot 111 defined longitudinally in the column 11. The second end of the column 11 has a recess 112 defined therein so as to receive a hub 40 of the wheel 41 of the bicycle.

A cylinder 20 has a first end and a second end, each of the first end and the second end having a hole 21, 22 defined therein, a bolt 30 extending through the hole 21 of the first end of the cylinder 20 and passing through the slot 111 of the column 11 to be engaged to the corresponding side plate 102 of the frame 10 so as to dispose the column 11 between the two sets of rollers 12 and each set of the rollers 12 are received in the corresponding first grooves 110 of the column 11, the second end of the cylinder 20 fixedly engaged to the column 11 by extending a bolt 31 through the hole 22 of the second end thereof and being engaged to the column 11.

A brake frame 50 being an inverted U-shaped configuration is connected to the respective first end of the two columns 11 with two distal ends thereof by bolts 32 such that the corresponding positions between the wheel 41 and the related brake components (not shown) disposed to the brake frame 50 are maintained the same when the wheel 41 ridden over a rugged road.

Figure 4:
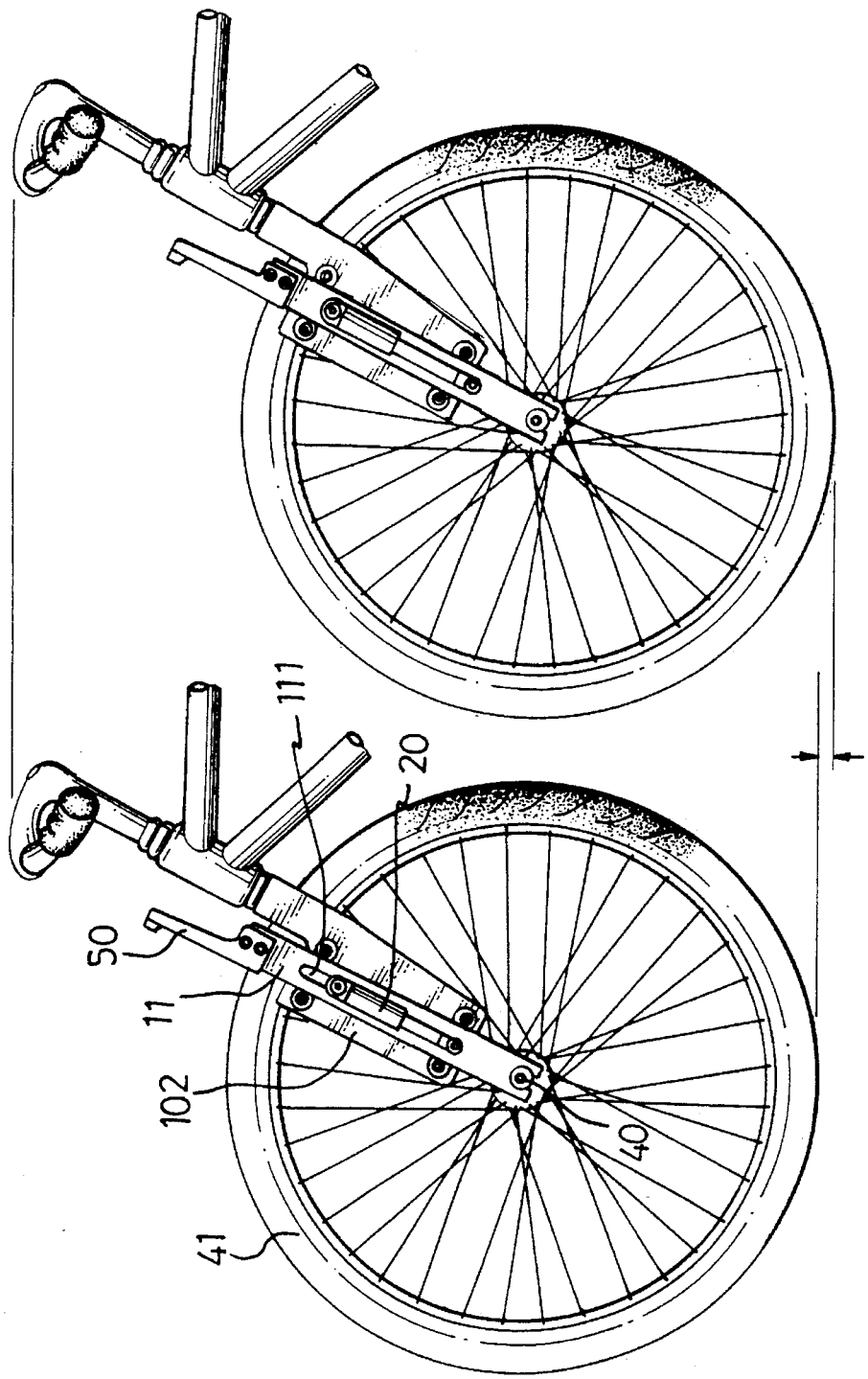
FIG. 4 is a side elevational view of the bicycle, which illustrates the shock absorbing device is actuated when the bicycle is ridden over a rugged road.

Referring to FIG. 4, when the bicycle is ridden over the rugged road, the wheel 41 may be pushed upwardly by the rugged road, the columns 11 are moved upwardly with the wheel 41 and because the first end of the cylinder 20 is fixed to the side plate 102 of the frame 10 and the second end of the cylinder 20 is fixed to the column 11 such that the movement of the column 11 will depress the cylinder 20 to absorb the shock and the shock therefore will not be transferred to the frame 10, therefore, a rider (not shown) does not experience discomfort through the uneven terrain. Furthermore, when the columns 11 are moved, they will be moved under a guidance of the rollers 12 which are received in the first grooves 110 of the columns 11 and therefore the columns 11 are moved stably.

Figure 5:
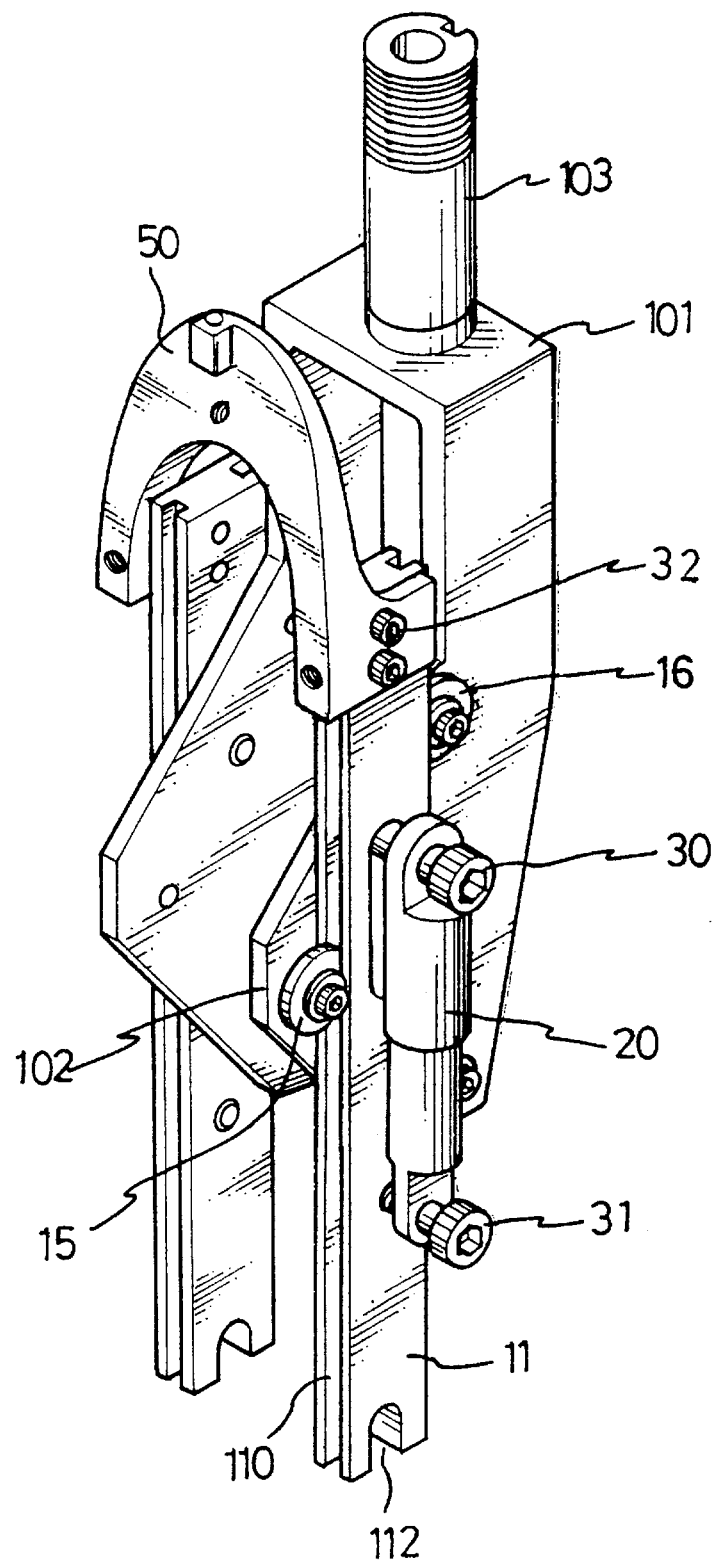
FIG. 5 is a side elevational view, partly in section, of another embodiment of the shock absorbing device in accordance with the present invention.

FIG. 5 shows another embodiment of the present invention wherein the two sets of rollers are arranged to include one set thereof which has only one roller 15 and the other set thereof has two rollers 16, of course, the numbers of each of the two sets of rollers can be changed, however, the minimum numbers of rollers is arranged as shown in FIG. 5.

Figure 6:
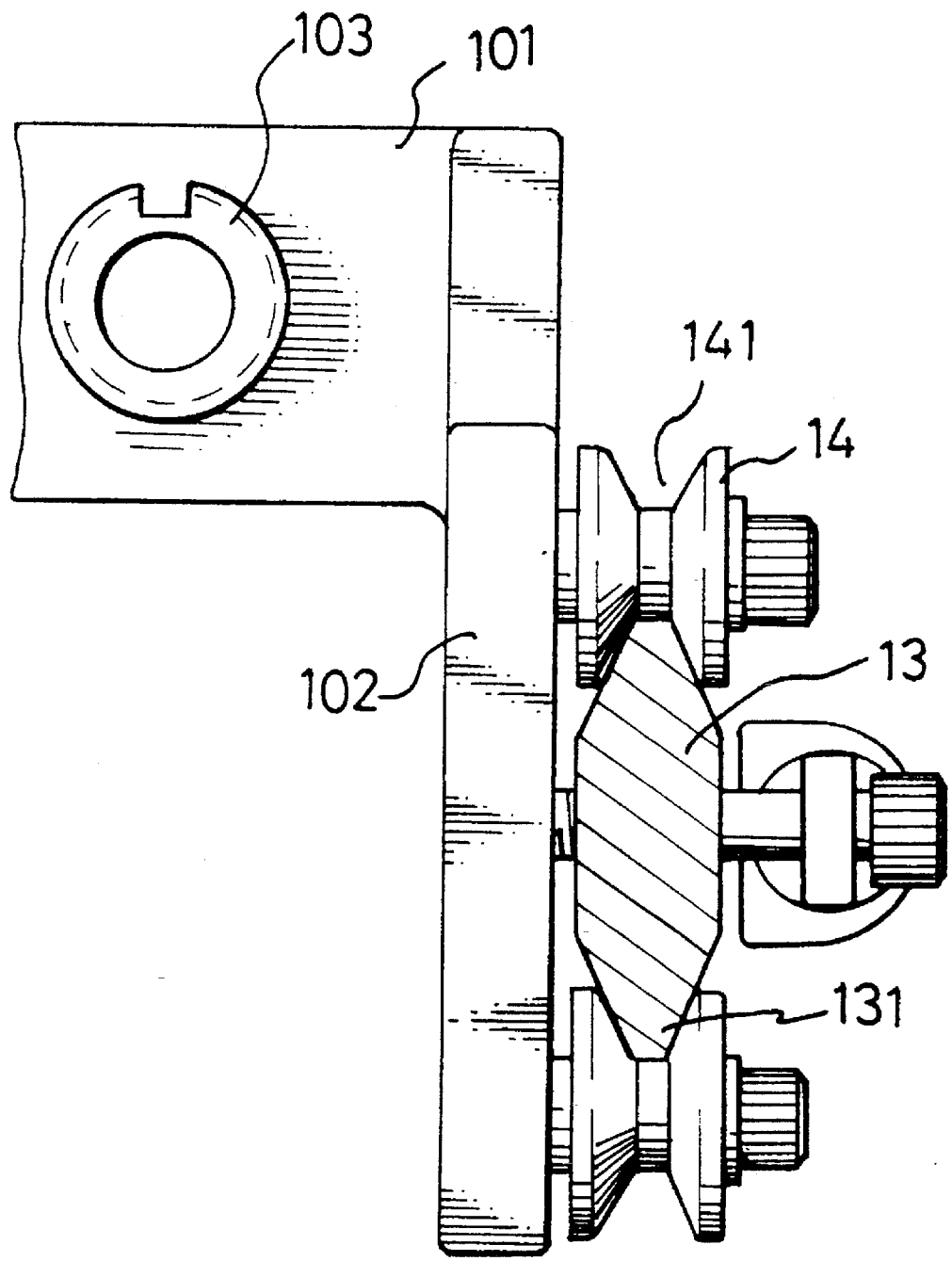
FIG. 6 is a side elevational view, partly in section, of yet another embodiment of the shock absorbing device in accordance with the present invention.

Referring to FIG. 6 which shows yet another embodiment of the present invention wherein each of the columns 13 has a flange 131 extending from each of the two sides thereof and each of the rollers 14 has a second groove 141 defined in a periphery thereof so as to receive the flange 131 of the column 13.

Accordingly, the present invention has two sets of rollers 12 to stably guide the movement of the columns 11 and has a simple structure which is easy to be maintained.

Although the invention has been explained in relation to its preferred embodiment, it is to be understood that many other possible modifications and variations can be made without departing from the spirit and scope of the invention as hereinafter claimed.

I claim:

1. A shock absorbing device for a bicycle and comprising:

a front fork, said front fork including a frame and two columns, said frame having a top and two side plates extending in parallel with each other and downwardly from said top, a steerer tube extending upwardly from said top, each of said side plates having two sets of rollers rotatably disposed to an outer side thereof, one set thereof having at least one roller and the other set thereof having at least two rollers, each of said columns having two sides and a first end and a second end, each of said sides thereof having a first groove defined longitudinally therein, a slot defined longitudinally in said column;

a cylinder having a first end and a second end, each of said first end and said second end having a hole defined therein, a bolt extending through said hole of said first end of said cylinder and passing through said slot of said column and being engaged to said corresponding side plate between said two sets of rollers and each of said two sets of rollers received in said corresponding first groove of said column respectively, said second end of said cylinder fixedly engaged to said column by extending a bolt through said hole of said second end thereof and being engaged to said column.

2. The shock absorbing device as claimed in claim 1 wherein said column has a flange extending from each of said two sides thereof and each of said rollers has a second groove defined in a periphery thereof so as to receive said flange of said column.

3. The shock absorbing device as claimed in claim 1 wherein a brake frame having an inverted U-shaped configuration is connected to said two first ends of said two columns by bolts.

* * * * *